United States Patent
Ming et al.

(10) Patent No.: US 12,478,086 B2
(45) Date of Patent: Nov. 25, 2025

(54) PET FOOD COOKER AND MIXER

(71) Applicant: ZHONGSHAN YALESI ELECTRIC APPLIANCE INDUSTRY CO., LTD., Guangdong (CN)

(72) Inventors: Lai Xue Ming, Guangdong (CN); Alejandro Lozano, Union City, NJ (US); Paul McGrath, Edgewater, NJ (US); Xia Yunbiao, Guangdong (CN); Zhu Zhanyi, Guangdong (CN); Lai Xueming, Guangdong (CN)

(73) Assignee: Zhonshan Yalesi Electric Appliance Industry Co., Ltd., Zhongshan (CN)

( * ) Notice: Subject to any disclaimer, the term of this patent is extended or adjusted under 35 U.S.C. 154(b) by 0 days.

(21) Appl. No.: 19/033,309

(22) Filed: Jan. 21, 2025

(65) Prior Publication Data

US 2025/0160383 A1    May 22, 2025

Related U.S. Application Data

(63) Continuation of application No. PCT/US2024/033652, filed on Jun. 12, 2024.

(30) Foreign Application Priority Data

Jun. 13, 2023 (CN) .......................... 202321515049.1

(51) Int. Cl.
*A23N 17/00* (2006.01)
*A01K 5/02* (2006.01)

(52) U.S. Cl.
CPC ......... *A23N 17/007* (2013.01); *A23N 17/002* (2013.01); *A23N 17/004* (2013.01); *A23N 17/005* (2013.01); *A01K 5/0258* (2013.01)

(58) Field of Classification Search
CPC ... A23N 17/004; A23N 17/005; A01K 5/0258
See application file for complete search history.

(56) References Cited

U.S. PATENT DOCUMENTS

| 4,146,333 A * | 3/1979 | Zani ...................... A47J 43/04 366/279 |
| 4,332,539 A | 6/1982 | Zani |

(Continued)

FOREIGN PATENT DOCUMENTS

| CN | 1118262 C | 8/2003 |
| CN | 204466755 U | 7/2015 |

(Continued)

OTHER PUBLICATIONS

Translation of CN-115301152-A (Year: 2022).*

(Continued)

*Primary Examiner* — Elizabeth M Kerr
(74) *Attorney, Agent, or Firm* — Adler Pollock & Sheehan P.C.

(57) ABSTRACT

A pet food cooker and mixer includes a housing within which is enclosed a motor and a removable mixing pot where the mixing pot is configured with curved walls and an open top, a longitudinal axis, and an outlet at one end. A mixer blade is driven by the motor and is configured with a shaft extending along the longitudinal axis within the mixing pot, the mixer blade comprising plurality of paddles extending radially from the shaft and configured to force food material toward the outlet and a scraper arm extending outward from the shaft, the scraper arm having a scraper paddle in contact with the curved walls. An extrusion auger is also driven by the motor and is configured to force food material through the outlet. The device is also configured with a heating element for heating the mixing pot.

15 Claims, 11 Drawing Sheets

(56) References Cited

U.S. PATENT DOCUMENTS

| | | | |
|---|---|---|---|
| 5,401,159 A | 3/1995 | Hsu | |
| 6,312,246 B1 | 11/2001 | Pozzobon | |
| 2008/0075817 A1* | 3/2008 | Backus | B01F 35/512 |
| | | | 99/485 |
| 2015/0366220 A1* | 12/2015 | Zhang | A23P 30/20 |
| | | | 425/382.3 |
| 2016/0219906 A1* | 8/2016 | Yu | G06Q 30/0601 |
| 2019/0335799 A1* | 11/2019 | Morin | B01F 35/714 |
| 2021/0045577 A1* | 2/2021 | Gill | A47J 27/08 |
| 2021/0345642 A1* | 11/2021 | Ait Bouziad | A23J 3/14 |

FOREIGN PATENT DOCUMENTS

| | | |
|---|---|---|
| CN | 108552068 A | 9/2018 |
| CN | 208542127 U | 2/2019 |
| CN | 208757481 U | 4/2019 |
| CN | 209020319 U | 6/2019 |
| CN | 214416299 U | 10/2021 |
| CN | 114190788 A | 3/2022 |
| CN | 115301152 A * | 11/2022 |
| CN | 115517190 A | 12/2022 |
| CN | 113812504 B | 3/2024 |
| DE | 9321105 U1 | 2/1996 |
| KR | 100978278 B1 | 8/2010 |
| KR | 101487892 B1 | 2/2015 |
| KR | 102268054 B1 | 6/2021 |

OTHER PUBLICATIONS

International Search Report and Written Opinion for PCT International Patent Application No. PCT/US2024/033652, mailed Oct. 2, 2024.

Lindley, "Mixing processes for agricultural and food materials: 3. Powders and particulates," Journal of Agricultural Engineering Research 49:1-19 (1991).

* cited by examiner

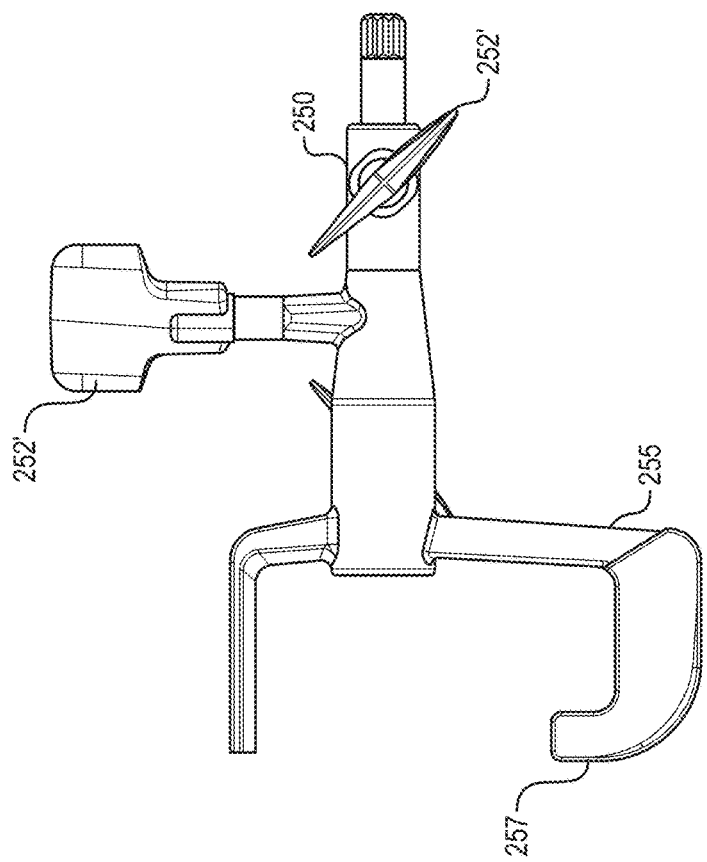
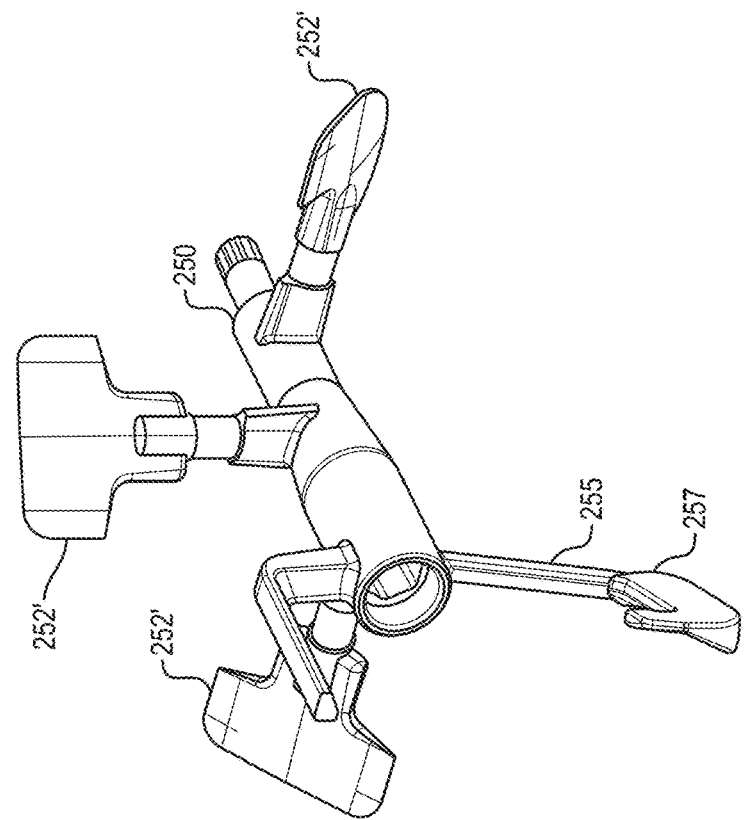

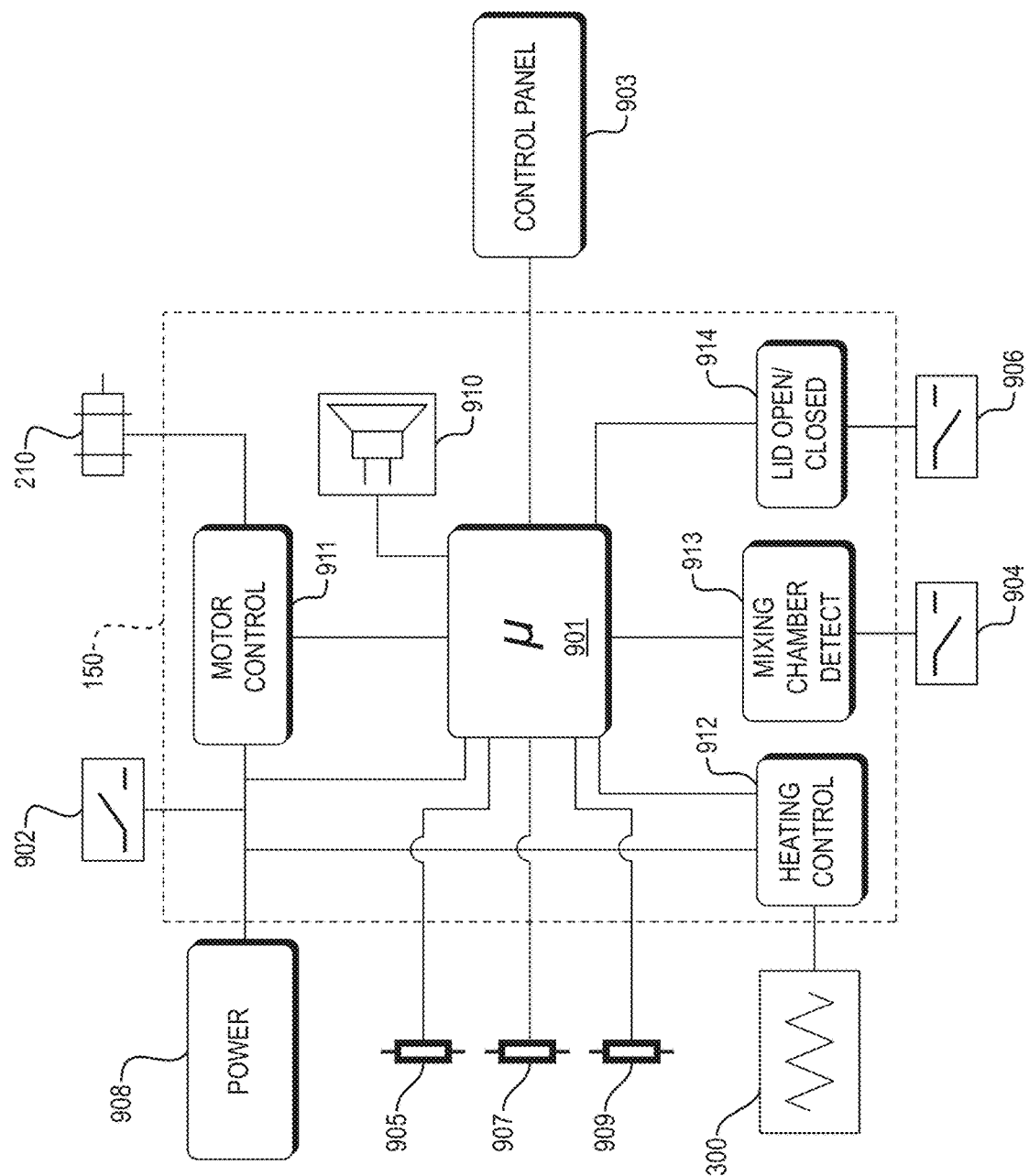

PET FOOD COOKER AND MIXER

CROSS-REFERENCE TO RELATED APPLICATIONS

This application claims the benefit of priority to Chinese Utility Model patent application Ser. No. 202321515049.1, filed Jun. 13, 2023, now Chinese Utility Model Patent No. CN220274820U, issued Jan. 2, 2024, the contents of which are incorporated herein by reference in its entirety.

BACKGROUND

Field

The present disclosure relates generally to devices for processing food, and, in particular, to a device that cooks and mixes pet food.

Description of the Problem and Related Art

Pet feeding machines can be used to regularly feed pet food to pets at home. The current pet feeding machines mainly process puffed pet food and freeze-dried pet food through a pet food manufacturing device and feed the processed pet food to pets. However, current pet food manufacturing equipment is difficult or impossible to process raw meat, bone-in meat and other food materials, and therefore cannot adapt to the current diversified pet food needs.

Further, conventional food processors may lack the ability to efficiently process different types of good materials with varying heating and mixing requirements. There is a need for a food processor that can adapt its operations to the specific characteristics of the food being processed, ensuring consistent quality and efficiency.

SUMMARY

For purposes of summary, certain aspects, advantages, and novel features are described herein. It is to be understood that not necessarily all such advantages may be achieved in accordance with any one particular embodiment. Thus, the apparatuses or methods claimed may be embodied or carried out in a manner that achieves or optimizes one advantage or group of advantages as taught herein without necessarily achieving other advantages as may be taught or suggested herein.

A pet food cooker and mixer includes a housing within which is enclosed a motor and a removable mixing pot where the mixing pot having curved walls and an open top, a longitudinal axis, and an outlet at one end. A mixer blade is driven by the motor and is configured with a shaft extending along the longitudinal axis within the mixing pot, the mixer blade comprising plurality of paddles extending radially from the shaft and configured to force food material toward the outlet and a scraper arm extending outward from the shaft, the scraper arm having a scraper paddle in contact with the curved walls. An extrusion auger is also driven by the motor and is configured to force food material through the outlet. The device is also configured with a heating element for heating the mixing pot.

In one embodiment, the outlet comprises an extrusion die head through which food material is extruded.

In a further embodiment, the cooker and mixer further comprises a rotating blade driven by the motor for cutting extruded food into nuggets.

In yet another aspect, the device is configured with a switch which enables activation of the heating element and the motor when the lid is closed.

In another aspect, the motor may impart rotation in a forward and a reverse direction.

In another embodiment, the device includes a control module for controlling the heating element and rotation of the mixer blade and the auger.

BRIEF DESCRIPTION OF THE DRAWINGS

The apparatus is described with reference to the accompanying drawings.

FIGS. 9A and 9B are a perspective view and a side elevation view, respectively, of the mixer blade according to an exemplary embodiment;

FIG. 10 is a functional schematic depicting control component of the exemplary pet food processor.

DETAILED DESCRIPTION

Figure 1:
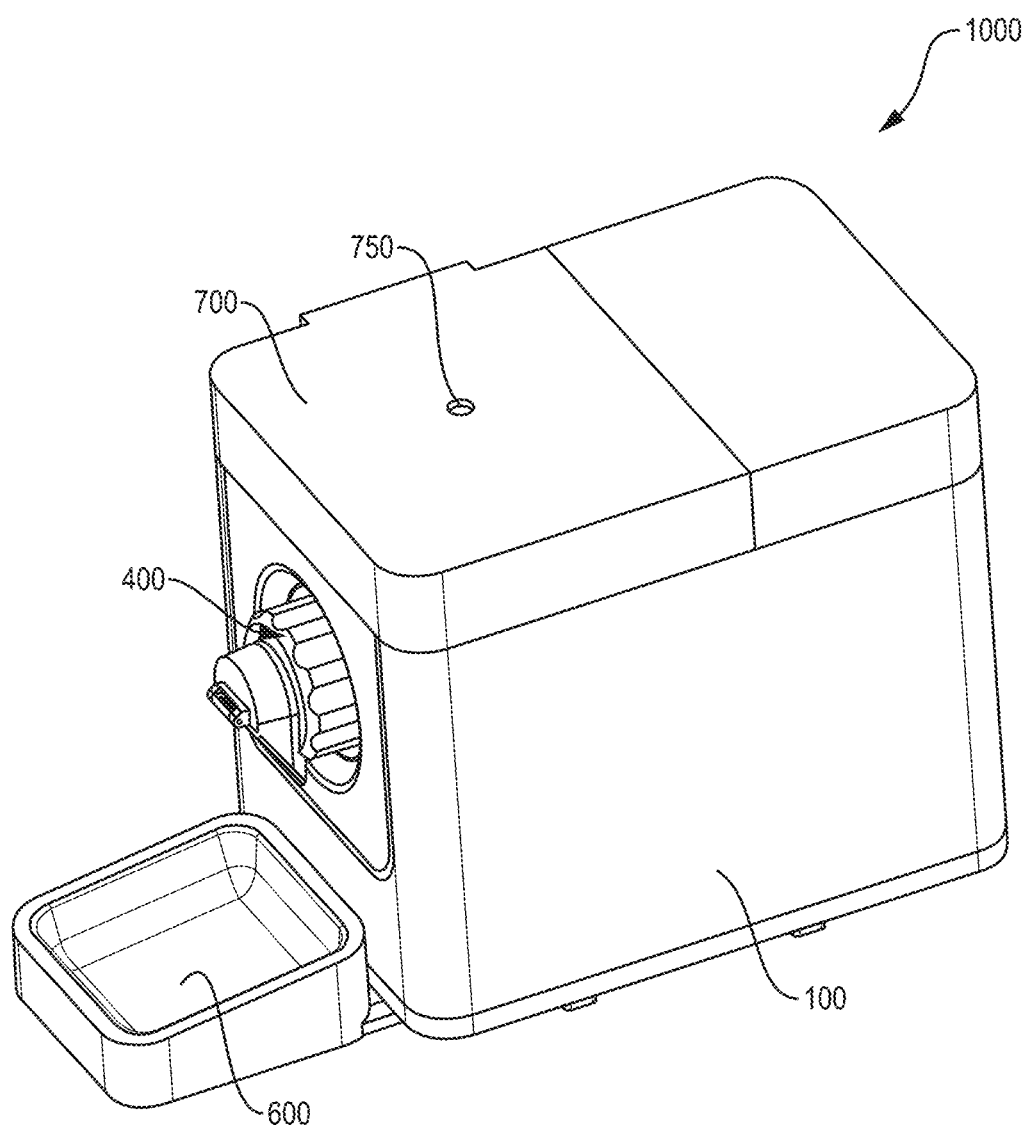
FIG. 1 is a perspective view of one exemplary embodiment of the pet food cooker and mixer.
Figure 2:
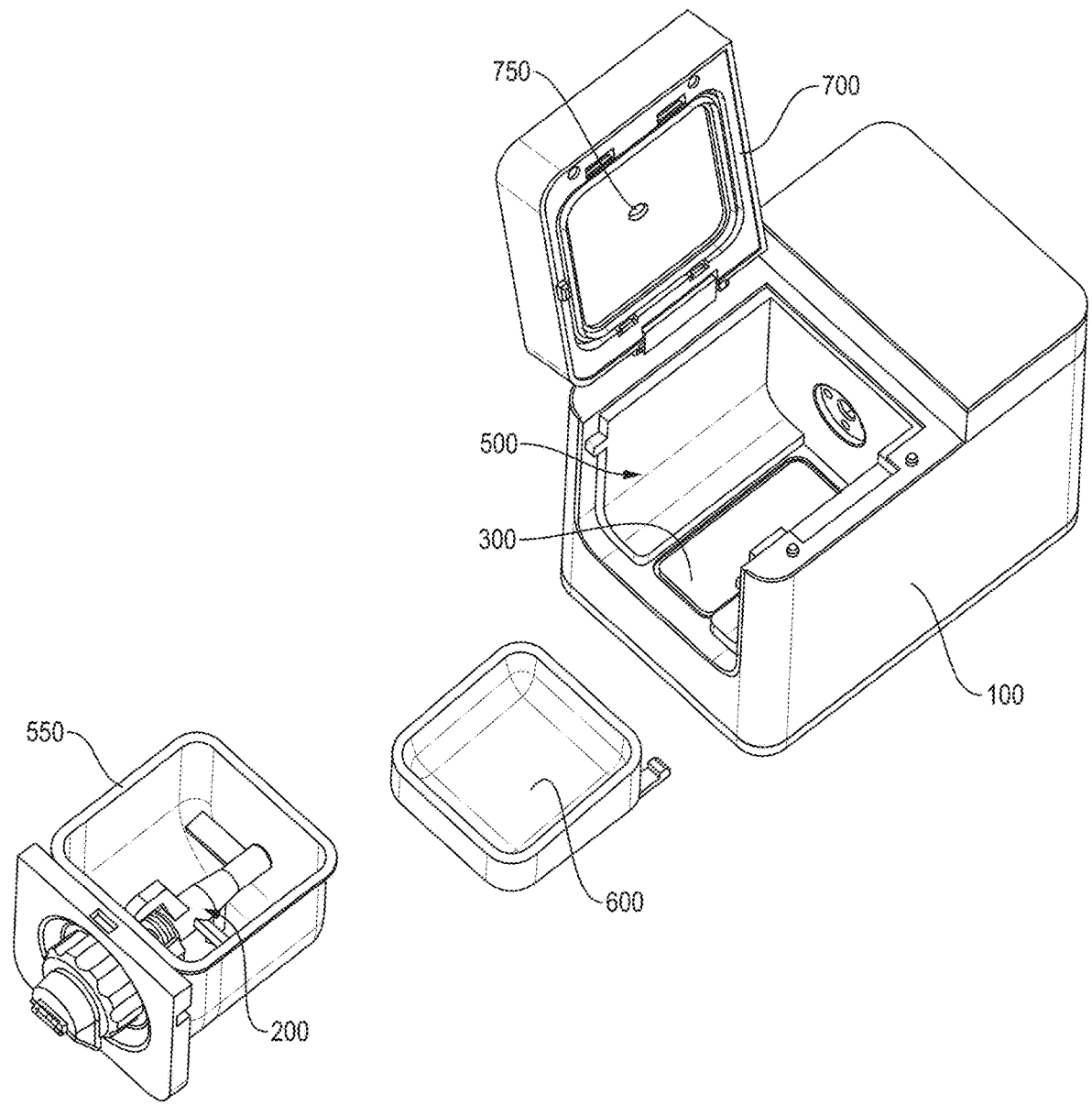
FIG. 2 is a perspective view showing the pet food cooker and mixer of FIG. 1 in a disassembled state.

The various embodiments of the pet food cooker and mixer and their advantages are best understood by referring to FIGS. 1 through 11 of the drawings. The elements of the drawings are not necessarily to scale, emphasis instead being placed upon clearly illustrating the novel features and principles of operation.

Furthermore, reference in the specification to "an embodiment," "one embodiment," "various embodiments," or any variant thereof means that a particular feature or aspect described in conjunction with the particular embodiment is included in at least one embodiment. Thus, the appearance of the phrases "in one embodiment," "in another embodiment," or variations thereof in various places throughout the specification are not necessarily all referring to its respective embodiment.

Referring first to the FIGS. 1 through 5, an exemplary pet food cooker and mixer 1000 comprises a housing 100 configured with a processing compartment 500 having an open top and an open discharge end and a control compartment 102. A wall separates processing chamber 500 from control compartment 102. Within control compartment 102 a motor 210 is mounted which is configured to drive gearing 213 connecting to rotatable shaft assembly 200 through an aperture in the wall.

Figure 3:
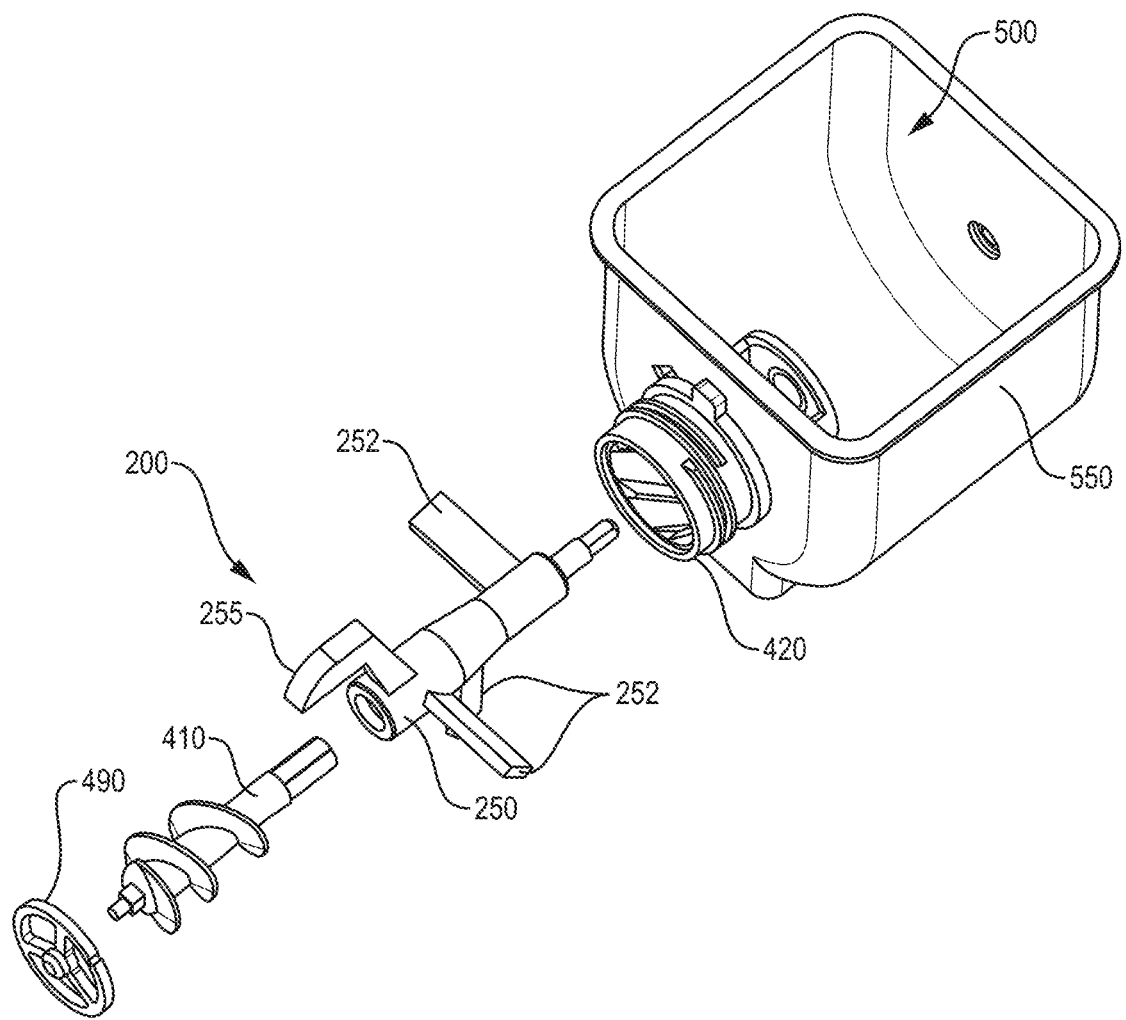
FIG. 3 is an exploded view of an exemplary processing chamber according an embodiment of the pet food cooker and mixer.
Figure 4:
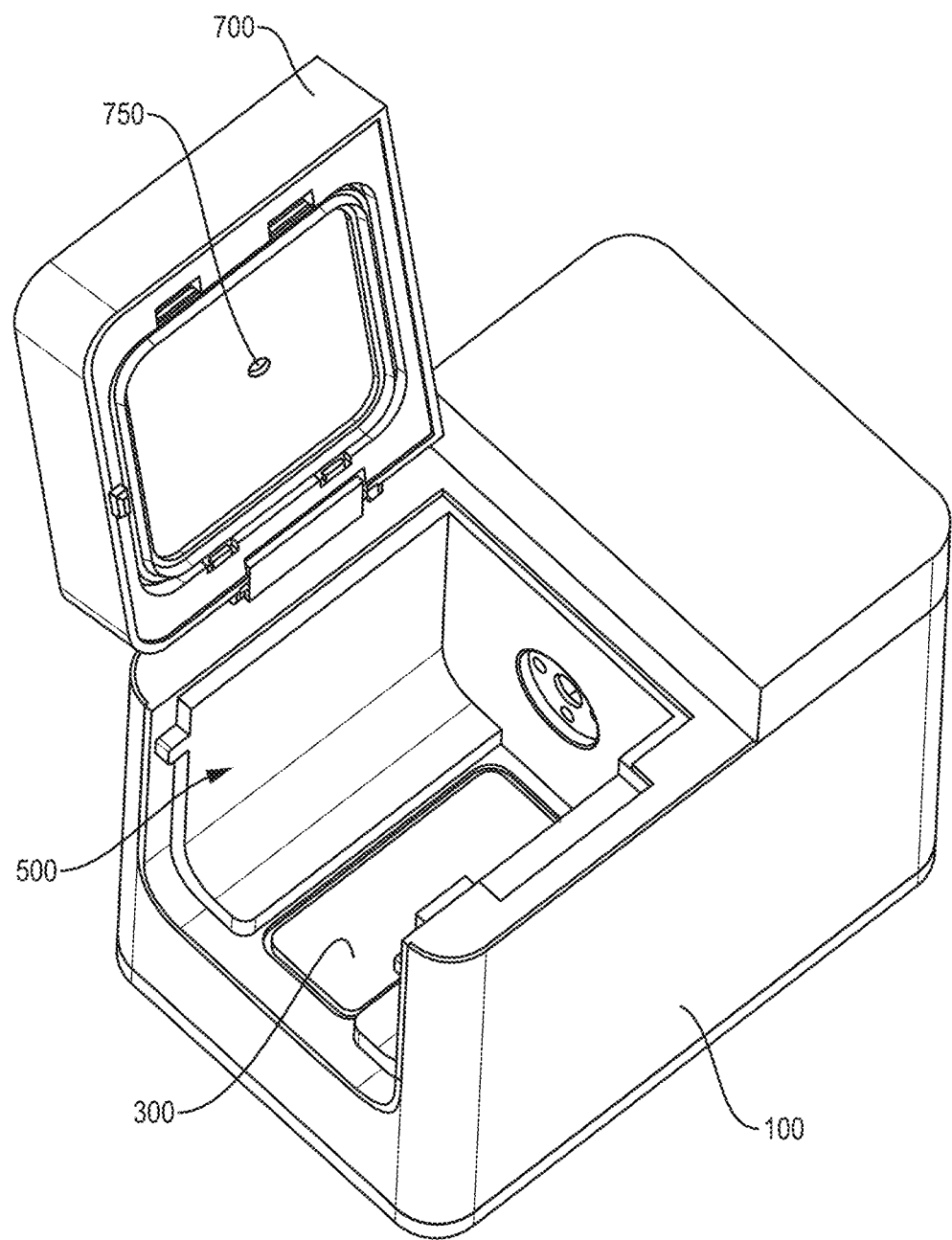
FIG. 4 is a perspective view of the exemplary pet food cooker and mixer illustrating an open housing.

A removable mixing pot 550 is provided which is configured to be seated within processing chamber 500. As best illustrated in FIG. 3, mixing pot 550 comprises an open top, curved side walls, and a discharge end wall configured with a discharge port 400. At the end opposite the discharge end wall, mixing pot 550 comprises a wall in which is defined an aperture corresponding to the aperture in the compartment wall through which the end of shaft assembly 200 extends. As such, motor 210 is configured to impart rotation to shaft assembly 200 which rotates within mixing pot 550. Mixing pot 550 is also configured with a floor that is sloped toward the discharge end. In one embodiment, the floor of mixing pot 550 is configured with a space for allowing liquid to settle to be heated by activation of heating element 300. Accordingly, food may be cooked with boiling water and/or steam.

Shaft assembly 200 comprises two components, a mixer shaft 250 and an auger 410 coaxially attached to mixer shaft 250 such that rotation of shaft assembly 200 rotates both mixer shaft 250 and auger 410. Mixer blade is configured with a plurality of paddles 252 extending radially from the shaft. Paddles 252 are generally rectangular in shape and have planar surfaces. The planar surfaces of the paddles are angled with respect to the axis of the shaft. Accordingly, during mixing, the paddles may push the mixing ingredients toward either end of mixing pot 550 depending on whether shaft assembly 200 is rotating clockwise or counterclockwise. Mixer shaft 250 may also comprise a scraper arm 255 extending radially from the axis terminating in a silicone scraper paddle 257. Auger 410 extends into an extrusion tube 420 which has an opening on the top and defines and extrusion chamber in communication with discharge port 400.

Housing 100 also comprises a heating plate 300 which is exposed in the bottom of processing chamber 500 such that when mixing pot 550 is seated within processing chamber 500, heating plate 300 is in thermal communication with mixing pot 550 floor. Mixing pot 550 is preferably formed, at least in part, from a heat conductive material. Heating plate 300 may be heated by a resistance heating element or other suitable heating means.

In operation, food ingredients, for example, meat, vegetables, grains, and a fluid, e.g., water or broth, may be placed within mixing pot 550. Heating plate, when energized, heats mixing pot 550 from the bottom of mixing pot 550 causing the ingredients therein to cook. Either concurrently with cooking or after cooking, motor rotates shaft assembly 200 which causes paddles 252 of mixer shaft 250 to rotate about mixing pot 550 thereby stirring, mixing or crushing the ingredients together within mixing pot 550. The angle of paddles 252 relative to the mixer shaft 250 shaft urges the mixed food toward discharge port 400. Further, it will be appreciated that the rectangular end shape of paddles 252 is advantageous for breaking up and churning food stuffs. Additionally, paddles 252 may be formed from a relatively stiff silicone. The sloped floor of mixing pot 550 allows food to move toward discharge port 400 aided by gravity.

As mixer shaft 250 rotates, scraper arm 255 is moved around the portion of mixing pot 550 near the discharge end thereof. The processed food is accumulated by a scraper paddle on the end of scraper arm 255. As the scraper paddle passes over the opening in the top of extrusion tube 420, food accumulated on the scraper paddle falls into the opening. Scraper paddle may be shaped to conform to the walls and corners of mixing pot 550 so that food does not accumulate in the corners. The food is then grabbed by auger 410 and conveyed toward discharge port 400. Discharge port 400 includes a die 490 through which the processed food is extruded. Discharge port 400 may also comprise a guide assembly 460 that guides the extruded food as it transfers from the conveying tube 420 to a feeding bowl 600. Guide assembly 460 comprises a cover portion 430 having a downward facing opening. The opening is covered by a spring-biased baffle 450 hingedly connected to the cover portion with a torsion spring so that once food is dropped into the feeding bowl 600, baffle 450 covers the opening. Baffle 450 thereby guides the food into the feeding bowl 600 in a controlled manner.

As described above, food heating and energizing of the heating plate 300 may be independent of operation of motor 210. Thus, the food ingredients may be cooked and then mixed by rotation of the mixer shaft 250. On the other hand, heating plate 300 and motor 210 can be operated together to complete processing of the food.

Figure 5:
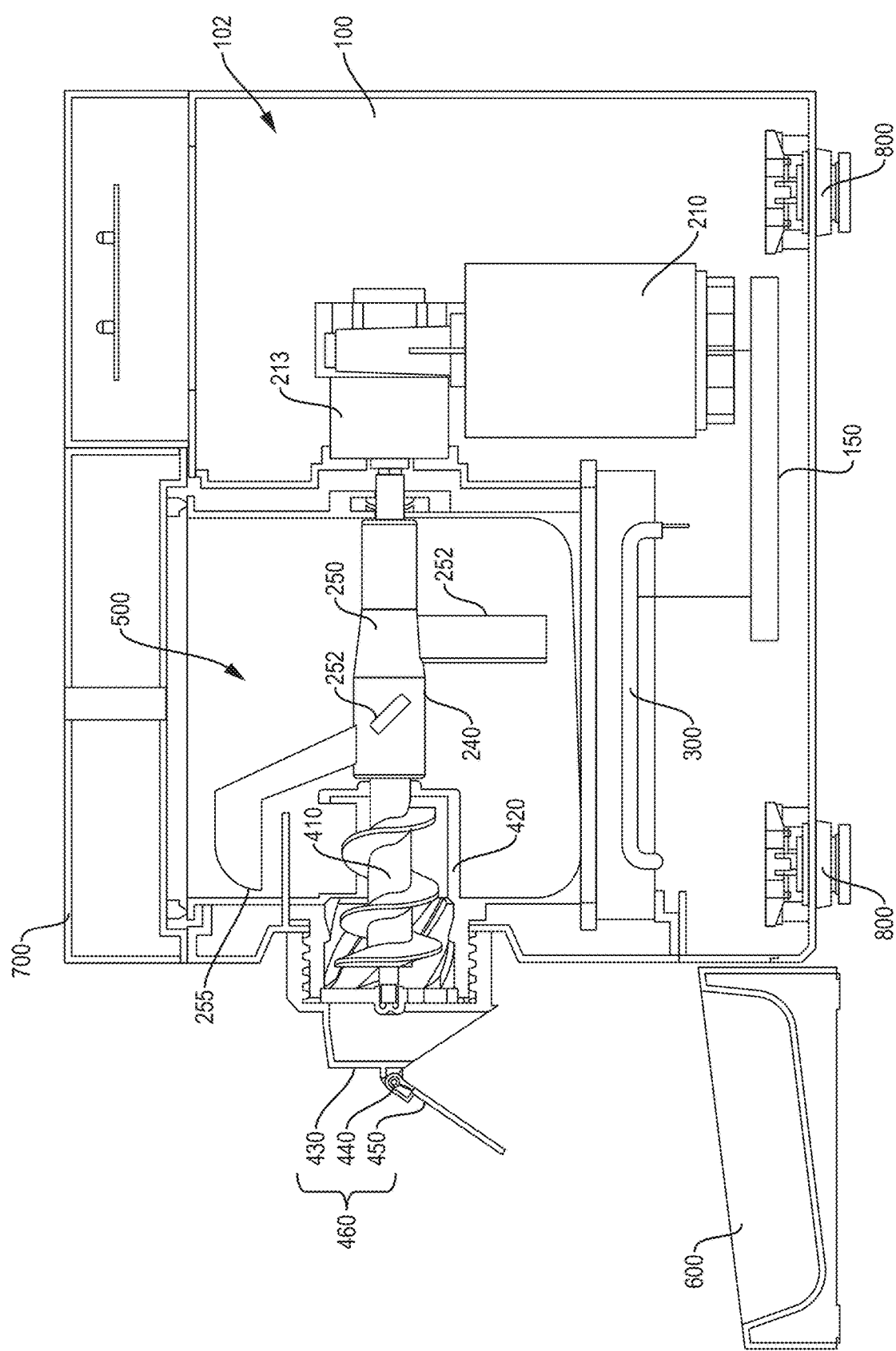
FIG. 5 is a section view of the exemplary pet food cooker and mixer.

In some embodiments, referring to FIG. 5, housing 100 may include a weighing module 800, which is used for weighing materials in the processing compartment 500. After the weighing module 800 weighs the food materials in the processing compartment 500, it can predict the amount of the food materials in the processing area 500 through a control module 150, thereby facilitating the control of the heating plate 300 and the shaft assembly 200, thereby ensuring that the two can fully process food materials smoothly and effectively.

Housing 100 includes a lid 700 pivotally connected to one side of the top opening, the lid 700 can rotate to open or close the processing compartment 500. Lid 700 is provided with a ventilation hole 750 and may be kept closed with a latch. The lid 700 prevents food materials from splashing out of processing compartment when mixer shaft 250 is mixing the food materials. Additionally, when heating plate 300 cooks food materials, air pressure in the processing area 500 will change due to the thermal expansion and contraction of the air. Ventilation hole 750 can provide air communication between the inside and outside of the processing compartment 500 to equalize air pressure within the processing compartment.

Figure 6:
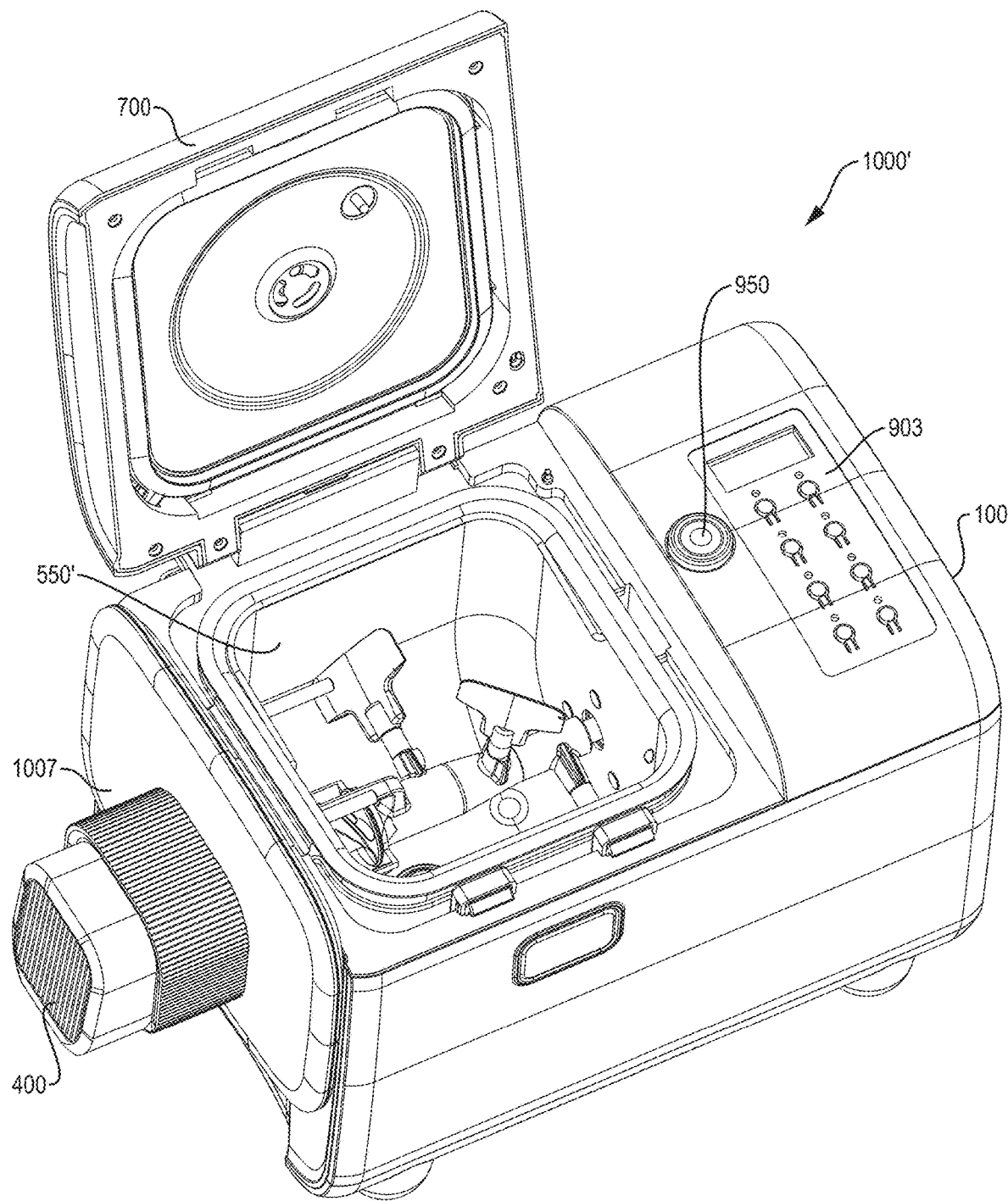
FIG. 6 is a top perspective view of another exemplary embodiment of the pet food cooker and mixer.
Figure 7:
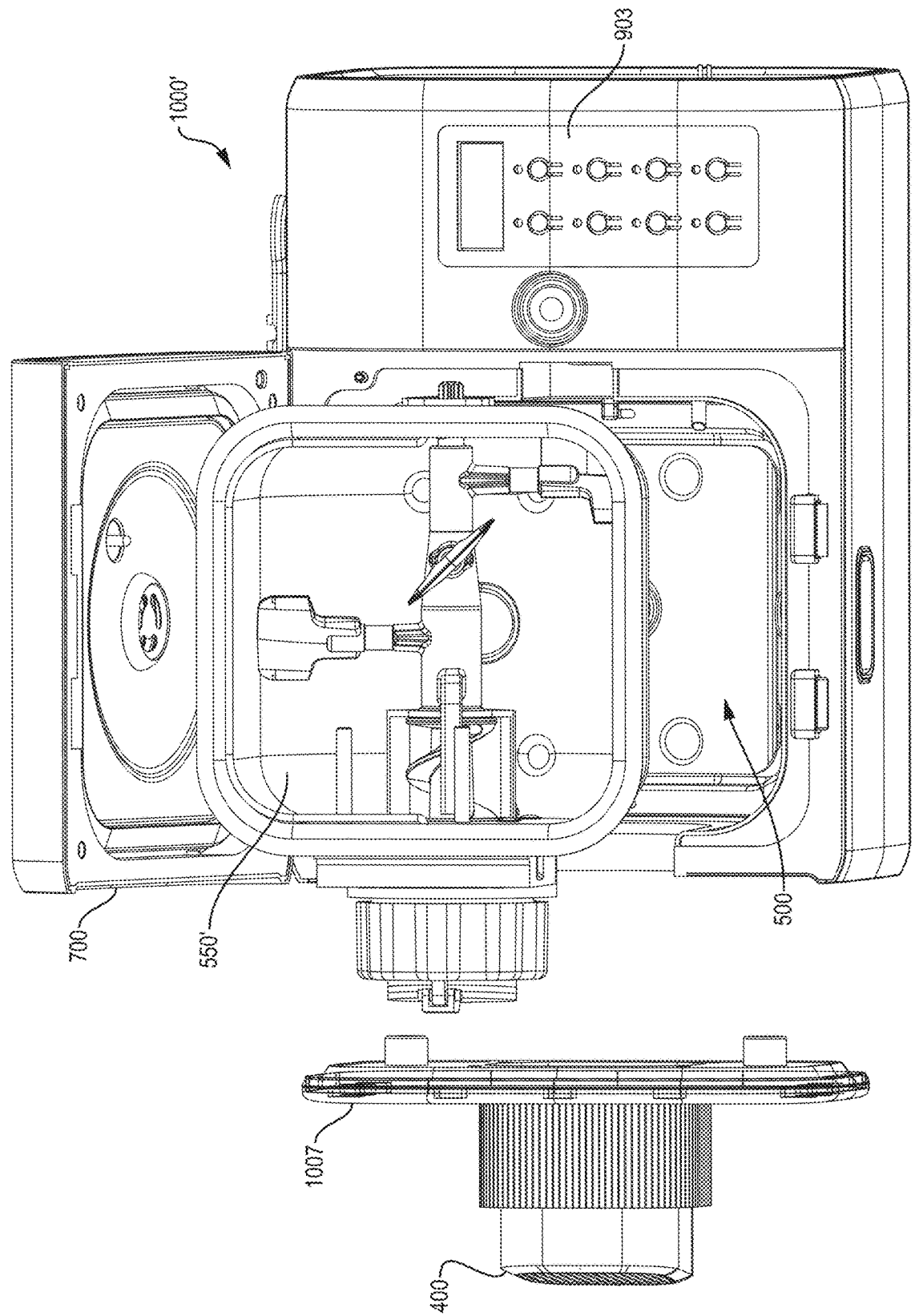
FIG. 7 is a top view of the embodiment shown in FIG. 6 illustrating removing of the mixing pot from the top of the device.

With reference now to FIGS. 6 and 7, a second embodiment of the pet food cooker and mixer 1000' is illustrated comprising housing 100 with a processing area 500 within which is seated a removable mixing pot 550'. In this embodiment, mixing pot 550' is removable from the top of the processing area 500 by opening lid 700 which is pivotally attached to housing 100. Mixing pot 550' is enclosed in the processing area 500 with a front cover 1007 located at the discharge end of the device 1000'. As shown front cover 1007 comprises discharge port 400. A control panel 903 is disposed on housing 100 and is configured as a user interface with control module 150 and which will be described in greater detail below. A button 950 may be provided for decoupling the shaft assembly 200 from the motor drive shaft as will be described below.

Figure 8:
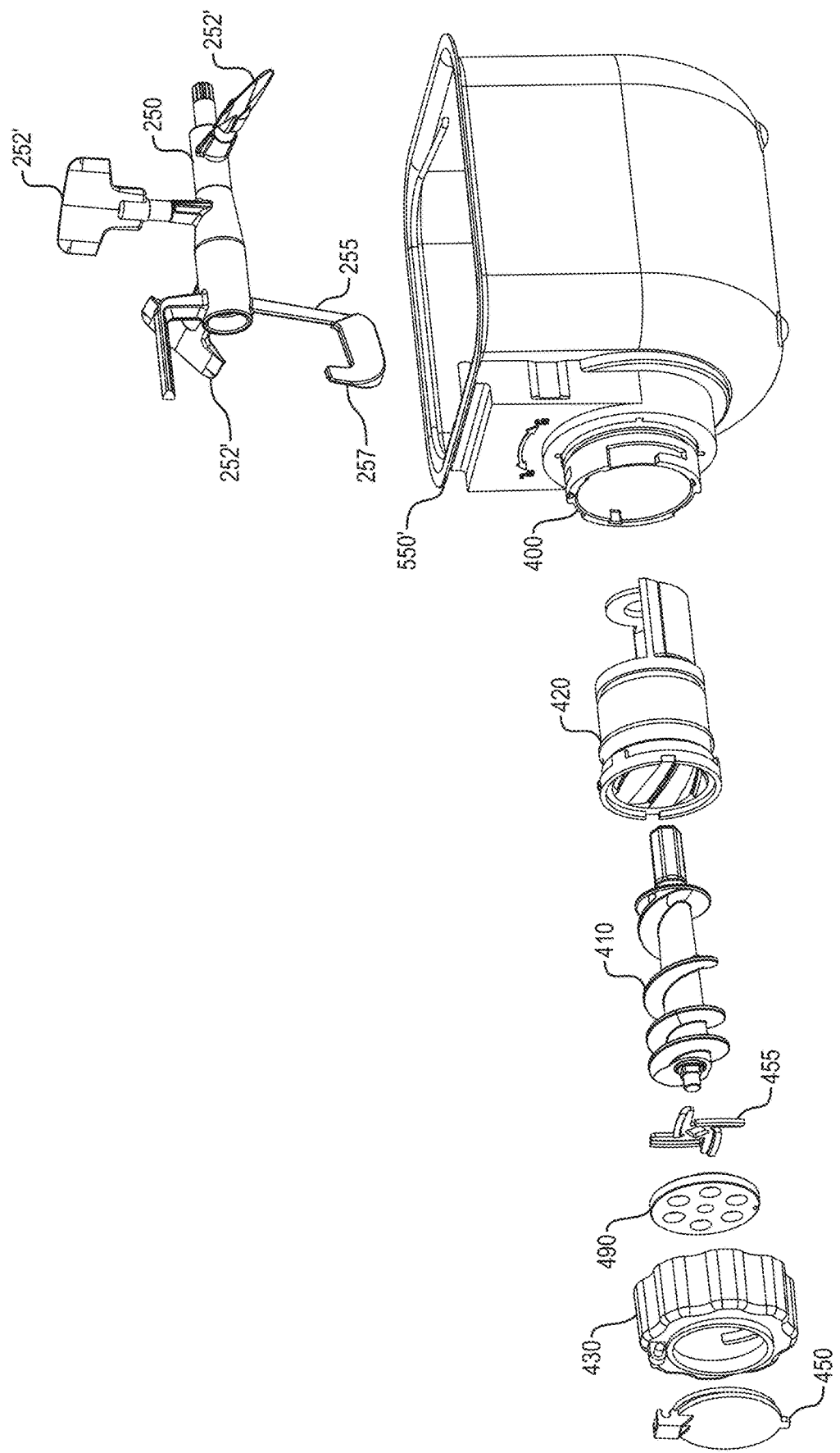
FIG. 8 is an exploded view of the mixing pot, the auger and the extrusion assembly according to an exemplary embodiment.

FIG. 8 is an exploded view of mixing pot 550' depicting mixer shaft 250 from which radially extend a plurality of paddles 252' and scraper arm 255. FIGS. 9A and 9B, present two views of mixer shaft 250 depicting paddles 252' that are configured with t-shaped fins on the radially distal ends thereof. Scraper arm 255 terminates in a scoop 257 having an open side oriented toward the axis of mixer shaft 250. In operation, as mixer shaft 250 rotates, paddles 252' and scraper arm 255 are moved angularly around the interior of mixing pot 550. Scoop 257 is configured to scrape food from the interior wall of mixing pot 550, and as scraper arm 255 traverses the upper portion of the interior of mixing pot 550, scraped food is allowed to fall from the open side of scoop 257.

Referring again to FIG. 8, mixing pot 550' is formed with discharge port 400 into which is inserted extrusion tube 420 which has an inward end with an open top and a barrel chamber toward the discharge port. Extrusion tube 420 enclosed auger 410 which is axially connecting to mixer shaft 250 such that as mixer shaft 250 rotates, so does auger 410. Discharge port 400 includes die 490 and a rotating blade 455 which is coupled to the end of auger 410 such that rotation of auger 410 also rotates blade 455. Die 490 is housed within cover 430 and a spring-biased baffle is pivotally connected to the outward end of cover 430.

Similar to the operation described above, food, e.g., a meat, being any of beef, chicken, pork, lamb, fish, etc., and/or a grain is cooked within mixing pot 550'. Either currently or after cooking, mixer shaft 250 rotates to mix the food together. The mixed food is urged toward the discharge end of mixing pot 550' and is conveyed into the open top part of extrusion tube 420 by rotation of scraper arm 255 and scoop 257. Auger 410 forces food into barrel and toward die 490. As food is extruded, it is cut by rotating blade 455, thus, forming kibble nuggets. The kibble nuggets are pushed through baffle 450.

FIG. 10 is a functional schematic of a control system for controlling the functions of the device. Control module 150 comprises a computer-based microcontroller 901 which is configured to execute the functions described herein. Control module 150 is responsive to a control panel 903 which is adapted to allow a user to control operation of the pet food processor. Power 908 is supplied from a conventional residential power circuit and is preferably 120V, 60 Hz but may be adapted for different regional power supply specifications. Power 908 is coupled to motor control circuitry 911 which controls power, speed, and rotational direction of motor 210. Motor control circuitry 911 is responsive to microcontroller 901.

Power 908 is also coupled to heating control circuitry 912 which controls energizing heating plate 300. Front cover detection switch 902 is provided to couple power to the components of the pet food processor when the front cover is closed, preventing operation of the device unless the front cover 1007 is properly seated. Similarly, a mixing pot 550 detection switch 904 may be coupled to mixing pot detection logic circuitry 913 for detecting the presence of mixing pot 550 in processing area 500. Lastly, the device 1000, 1000' may include a switch 906 to detect whether lid 700 is closed. Switch 906 is responsive to closed lid detection circuitry 914. Detection circuitry 913, 914 relays signals to microcontroller 901 to indicate that mixing pot is properly seated and the lid is closed, respectively. Microcontroller 901 is configured with control logic to inhibit operation unless these two conditions are true.

Advantageously, the device 1000, 1000' may comprise one or more heat detection elements 905, 907, 909 for measuring temperature of areas of the device. For example, a thermistor device 905, 907, 909 may be associated with any one or all of lid 700, the bottom of mixing pot 907, and heating plate 300. Microcontroller 901 may be configured with receive temperature data from heat detection elements 905, 907, and 909 and de-energize heating element 300 when a detected temperature reaches a pre-programmed threshold. Heat detection elements 905, 907, 909 may be, by way of non-limiting example, a negative temperature coefficient (NTC) thermistor.

Control module 150 may also comprise an audible alert device 910 responsive to microcontroller 901. Microcontroller 901 may be configured with control logic to activate audible alert device when food cooking and/or processing is complete, when a threshold temperature has been detected, or when any of the components is not properly seated.

As described above, control panel 903 is the user interface with device 1000, 1000'. It may be configured to allow a user to power the device, set a timer, and activate cooking or mixing. In one embodiment, control panel may be configured to allow a user to specify the type of food, i.e., beef, chicken, pork, fish, etc., and the microcontroller 901 may be configured with control logic to energize heating element 300 until the appropriate temperature is reached based on the food type specified.

In accordance with embodiments, a mobile device may be configured with an application for controlling pet food cooking and mixing device. In this embodiment, the pet food cooker and mixer is configured with a transceiver for communicating over a network with the mobile device.

The mobile device comprises a software application executable on a computing device, which is configured to receive user input and send commands to the cooking and mixing device. The device is configured to cook and mix food based on the command, adjust time and temperature settings, and select types of food to be cooked and mixed based on user input. The computing device is configured to display data related to the cooking and mixing process and to run the software application, which is further configured to access information related to the process.

In accordance with other embodiments, the application may display data related to the cooking and mixing process on the computing device, accessing information such as recipes, and caloric data based upon the type of food and the volume of serving.

Figure 11:
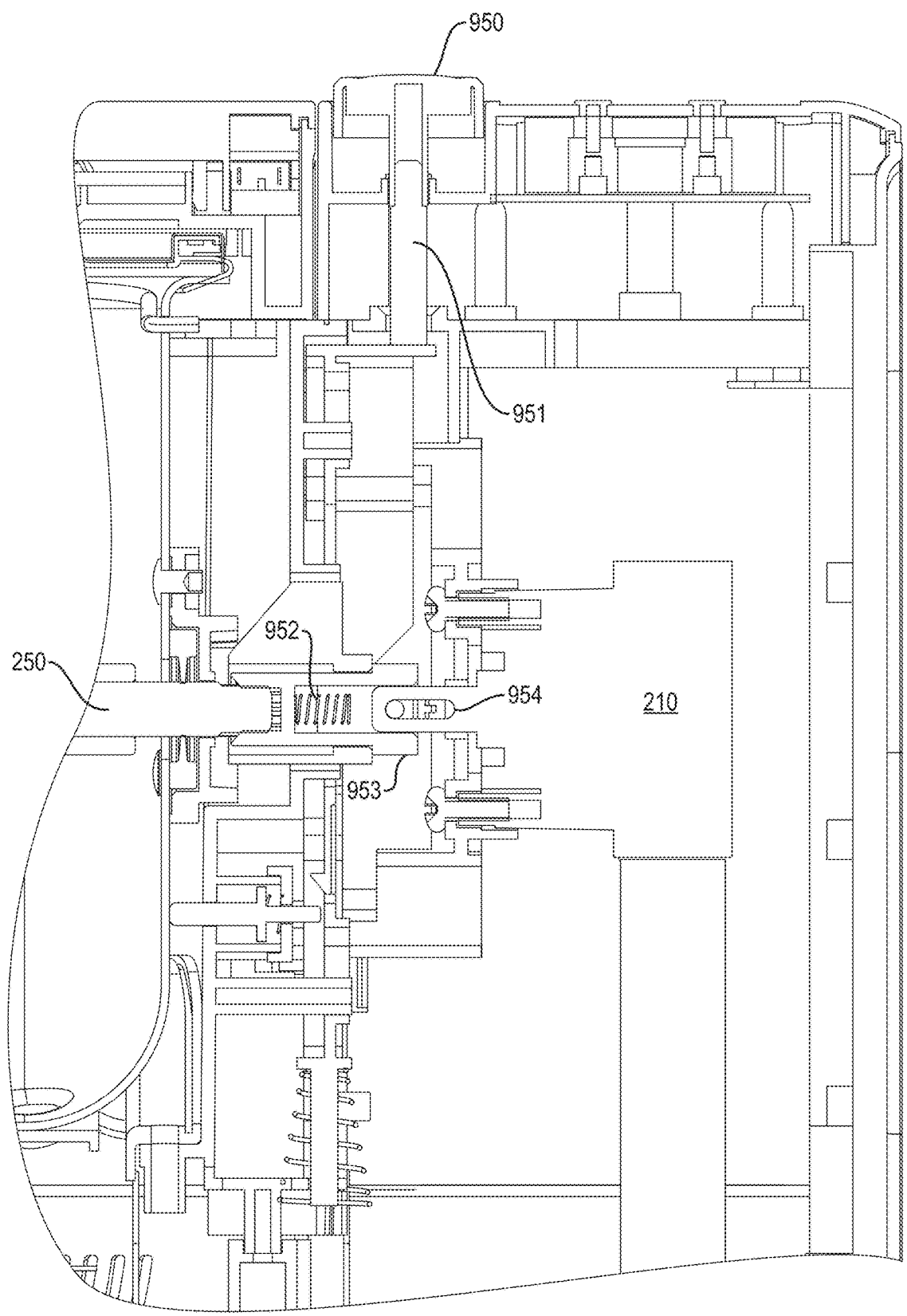
FIG. 11 is a partial, sectional view of an exemplary pet food cooker and mixer illustrating the interface between the motor drive shaft and the mixer shaft.

FIG. 11 is a partial sectional view of the pet food cooker and mixer showing the interaction of the mixer shaft 250 (and thus the shaft assembly 200) with the motor 210, and, in particular, the motor drive shaft 954. In this embodiment, housing 100 is fitted with a button 950 from which extends plunger 951 that engages with coupler 953. Coupler 953 is slidably engaged with drive shaft 954 and with mixer shaft 250. Coupler 953 comprises a compression spring 952 to bias coupler 953 toward mixer shaft 250. Accordingly, drive shaft 954 is usually coupled to mixer shaft 250 when pot 550 is seated within processing chamber 500.

Clearly, when it is desired to remove mixing pot 550 from processing chamber 500, mixer shaft 250/shaft assembly 200 must be disengaged from drive shaft 954. To do so, a user depresses button 950 which forces plunger 951 toward coupler 953, urging coupler 953 away from mixer shaft 250, thus, decoupling mixer shaft 250 from drive shaft 954.

As described above and shown in the associated drawings, the present disclosure is directed to a pet food cooker and mixer. While particular embodiments have been described, it will be understood, however, that any invention appertaining to the apparatus/system/method described is not limited thereto, since modifications may be made by those skilled in the art, particularly in light of the foregoing teachings. It is, therefore, contemplated by the appended claims to cover any such modifications that incorporate those features or those improvements that embody the spirit and scope of the invention.

What is claimed is:

1. A food processor comprising:
   a housing;
   a motor within the housing;

a removable mixing pot within the housing, the removable mixing pot removable from a top of the processing area by opening a lid that is pivotally attached to housing, the mixing pot having curved walls and an open top, a longitudinal axis, and an outlet at one end;

a mixer blade comprising a shaft extending along the longitudinal axis within the mixing pot and rotationally driven by the motor, the mixer blade comprising a plurality of paddles extending radially from the shaft and configured to force food material toward the outlet and a scraper arm extending outward from the shaft, the scraper arm having a scraper paddle in contact with the curved walls;

an extrusion auger driven by the motor configured to force food material through the outlet; and a heating element within the housing for heating the mixing pot.

2. The food processor of claim 1, wherein the outlet comprises an extrusion die head through which food material is extruded.

3. The food processor of claim 2, further comprising a rotating blade driven by the motor for cutting extruded food into nuggets.

4. The food processor of claim 1, wherein the extrusion auger is configured to rotate in the opposite direction from the mixer blade.

5. The food processor of claim 1, wherein the extrusion auger extends from an end of the mixer blade.

6. The food processor of claim 1, further comprising a lid to close over the open top of the mixing pot.

7. The food processor of claim 6, further comprising a switch which enables activation of the heating element and the motor when the lid is closed.

8. The food processor of claim 1, wherein the motor may impart rotation in a forward and a reverse direction.

9. The food processor of claim 1, further comprising a control module for controlling the heating element and rotation of the mixer blade and the auger.

10. The food processor of claim 9, wherein the outlet comprises an extrusion die head through which food material is extruded.

11. The food processor of claim 9, further comprising one or more temperature sensors responsive to the control module, and wherein the control module is configured to de-energize the heating element when the one or more temperature sensors detect a threshold temperature.

12. The food processor of claim 11, wherein the threshold temperature is based upon the food being processed.

13. The food processor of claim 12, wherein the food is one of beef, chicken, fish, and pork.

14. The food processor of claim 9, further comprising a switch which enables activation of the heating element and the motor when the lid is closed.

15. The food processor of claim 14, further comprising a user interface for the control module, the user interface configured to allow a user to specify the type of food being processed, the food being one of beef, chicken, fish, and pork.

* * * * *